United States Patent [19]

Leiber

[11] Patent Number: 4,779,202

[45] Date of Patent: Oct. 18, 1988

[54] PROPULSION CONTROL USING LONGITUDINAL ACCELERATION AND STEERING ANGLE TO DETERMINE SLIP THRESHOLD

[75] Inventor: Heinz Leiber, Oberriexingen, Fed. Rep. of Germany

[73] Assignee: Daimler-Benz Aktiengesellschaft, Stuttgart, Fed. Rep. of Germany

[21] Appl. No.: 943,694

[22] Filed: Dec. 19, 1986

[30] Foreign Application Priority Data

Dec. 21, 1985 [DE] Fed. Rep. of Germany ....... 3545717

[51] Int. Cl.$^4$ .............................................. B60T 8/58
[52] U.S. Cl. .............................. 364/426.03; 303/100; 180/197
[58] Field of Search .................... 364/426, 431.07; 180/197; 361/238; 303/95, 97, 100

[56] References Cited

U.S. PATENT DOCUMENTS

| | | | |
|---|---|---|---|
| 3,910,647 | 10/1975 | Takeuchi | 180/197 |
| 4,036,536 | 7/1977 | Quon | 303/97 |
| 4,042,059 | 8/1977 | Bertolasi | 303/100 |
| 4,453,516 | 6/1984 | Filsinger | 123/352 |
| 4,484,280 | 11/1984 | Brugger et al. | 364/426 |
| 4,511,014 | 4/1985 | Makita | 180/197 |
| 4,657,313 | 4/1987 | Fennel et al. | 303/100 |

Primary Examiner—Gary Chin
Attorney, Agent, or Firm—Barnes & Thornburg

[57] ABSTRACT

A propulsion control system for motor vehicles for preventing unstable driving conditions that are caused by a tendency to spin of at least one driven wheel, having a longitudinal acceleration sensor, a vehicle speed sensor and a steering angle sensor, in which case, in an electronic device, a maximum lateral acceleration value assigned to the longitudinal acceleration is determined, and a vehicle speed limit value is formed that is assigned to said lateral acceleration value and to the steering angle, and when said vehicle speed limit value is exceeded an intervention takes place in the sense of a power reduction into the control element of the vehicle engine.

5 Claims, 1 Drawing Sheet

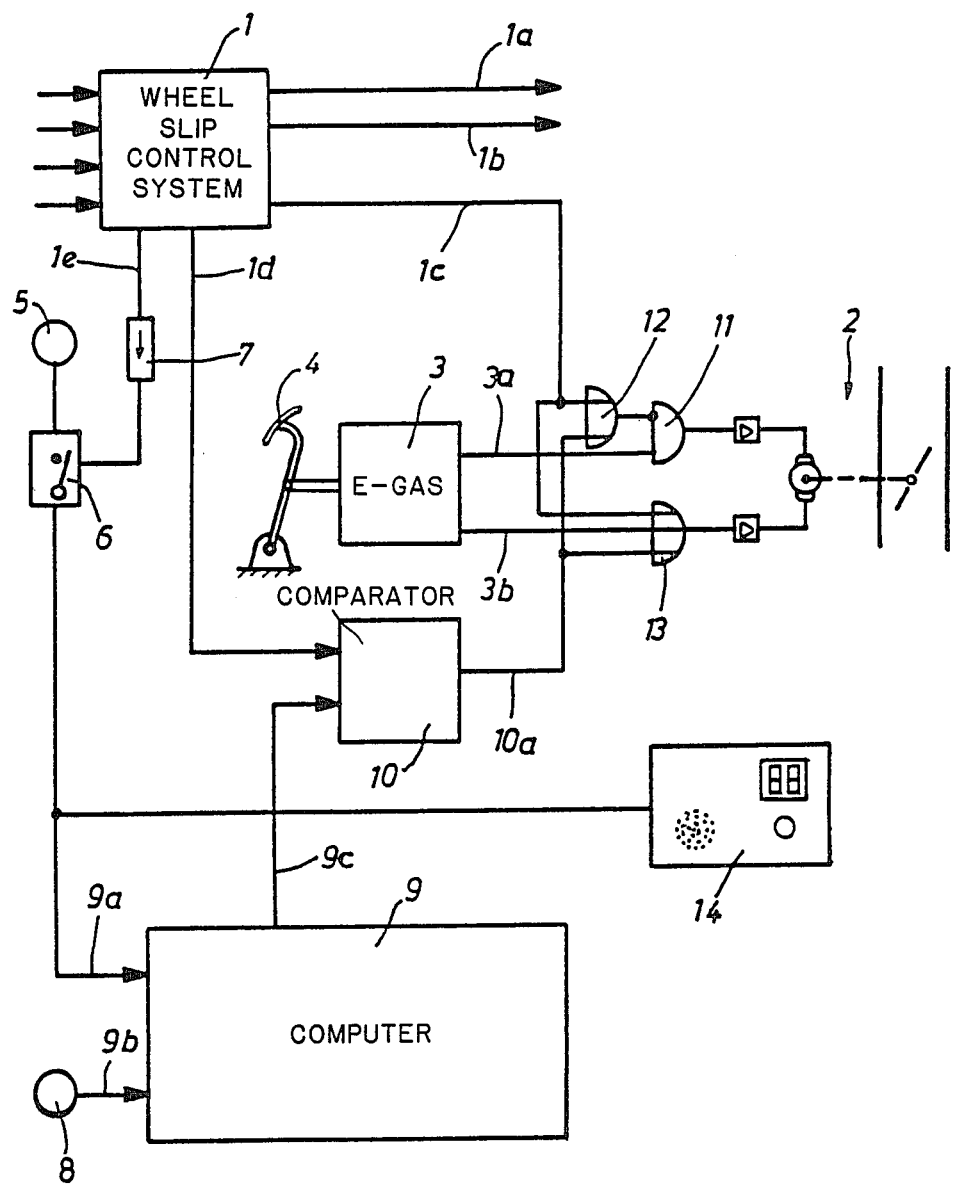

PROPULSION CONTROL USING LONGITUDINAL ACCELERATION AND STEERING ANGLE TO DETERMINE SLIP THRESHOLD

BACKGROUND AND SUMMARY OF THE INVENTION

The invention relates to a propulsion control system for motor vehicles as shown in U.S. Pat. No. 4,484,280. The system of U.S. Pat. No. 4,484,280 reduces the power of the vehicle engine when a driven wheel tends to spin. Spin is determined when vehicle speed exceeds an upper vehicle speed threshold value during straight-ahead driving or a lower vehicle speed threshold value during cornering or when an indicated threshold value of the longitudinal acceleration of the vehicle is exceeded.

Unstable driving conditions occur, for example, when the driven wheels spin or when the maximally transferable concerning force is exceeded. To indicate in each case only one certain vehicle speed threshold value for straight-ahead driving and for driving turns, as in the case of the known system, meets the existing requirements only with respect to one respective operating point. In certain situations, an unstable condition may occur at speeds below these threshold values so that this system offers no suitable protection in this respect.

It is the objective of the invention to provide a system that is able to avoid unstable driving conditions when wheel slip occurs.

It is possible that unstable conditions may also occur when no wheel slip is measured, for example, when at a constant speed, an increasingly narrower turn is driven. Such conditions are measured by means of the comparison of the measured lateral acceleration with the threshold values derived from the difference of the wheel speeds and/or from the steering angle and are not the object of the invention.

The invention utilizes the longitudinal acceleration of the vehicle at the very moment at which a driven wheel tries to spin. This indicates that the adhesion coefficient is fully used, at least at one wheel. There is a direct relationship between the adhesion coefficient and the maximal longitudinal acceleration. A vehicle with all-wheel drive comes closest to the actual situation, all its wheels being in the wheel slip control range. In the case of rear-driven vehicles, the load will produce inaccuracy that, if necessary, can be compensated by a load-dependent emitter signal.

The maximal longitudinal acceleration and the maximal lateral acceleration have a relationship to one another via the so-called frictional connection cycle. The maximal lateral acceleration, in the case of all vehicle-road conditions, has approximately the same relationship to the maximal longitudinal acceleration and can either be calculated from it by multiplication or can be taken from an empirically determined table. Therefore, if a limit value is provided for the lateral acceleration, it is easy to indicate from it, in connection with the steering agle, a limit value for the vehicle speed. The actual vehicle speed will then be compared with the limit valve and reduced in the case of an exceeding of the driving power.

The value of the maximally possible longitudinal acceleration of the vehicle determined in the case of a slip tendency is therefore also an approximate value for the adhesion coefficient between the vehicle and the road at that moment. After a suitable conversion, this value can be displayed and can be used by the driver as a guide for his method of driving.

As a result, it is possible to reduce the power of the vehicle before slip-caused unstable driving conditions can occur.

A proposed control system to achieve these functions includes an electronic device for receiving the output signals of the steering angle sensor and, starting at the point in which the spinning tendency of at least one of the spin wheels is determined by the wheel slip control system, for receiving the output signal of a longitudinal acceleration sensor. The electronic device includes a first circuit for determining a value of lateral acceleration from the value of longitudinal acceleration that is determine when a spinning tendency of wheel occurs. A second circuit in the electronic device determines the threshold value of vehicle speed from the determined lateral acceleration value and the steering angle. This threshold value of vehicle speed is compared in a comparator with the output signal of the vehicle speed sensor and provides an output signal when the vehicle speed exceeds the threshold value. A control system for the power control element of the vehicle reduces the power in response to the output of the comparator. This reduction is irrespective of the position of the gas pedal and overrides the gas pedal. The first and second circuits may be calculators or include look-up tables. The input signal of the electronic device that is assigned to the longitudinal acceleration is provided to a display unit for displaying of value symbolizing a certain adhesion coefficient as a function of longitudinal acceleration input. The display may be acoustic and/or visual.

Other objects, advantages and novel features of the present invention will become apparent from the following detailed description of the invention when considered in conjunction with the accompanying drawings.

BRIEF DESCRIPTION OF THE DRAWINGS

The FIGURE is a block diagram of a propulsion control system for motor vehicles incorporating the principles of the present invention.

DETAILED DESCRIPTION OF THE DRAWINGS

The diagrammatic drawing shows a wheel slip control system, abbreviated "ASR", that is represented as a box 1 and is known per se, to which, indicated by arrows, the output signals of wheel speed sensors that are not shown are fed as input signals. The ASR system produces control signals 1a, 1b for the brakes, signal 1c for the power control element 2 of the vehicle engine that is not shown, an output signal 1d for the vehicle speed and another signal 1e that appears when it least one of the output signals 1a, 1b or 1c appears. This signal 1e means that at least one wheel threatens to spin and is ASR-controlled.

In addition, an electronic system 3 is provided that is known as "E-Gas" and permits a controlled intervention of the power control element 2 so that irrespective of the position of the gas pedal 4, the power can be reduced but cannot be increased above the power assigned to the gas pedal position.

A longitudinal acceleration sensor 5, the output signal of which is proportional to the longitudinal acceleration of the vehicle, via an analog switch 6, is connected with the input 9a of an electronic device 9 called a "characteristic driving diagram". The analog switch 6 is switched by the output signal 1e of the ASR-unit 1 via a time function element 7 that prolongs the signal to an indicated duration. The output signal of a steering angle sensor 8 is fed to the second input 9b of the electronic device 9.

The characteristic driving diagram of electronic device 9 consists of a computer and memory unit that, from the two input signals longitudinal acceleration 9a and steering angle 9b, generates an output signal 9c that is proportional to the maximally admissible vehicle speed. The characteristic driving diagram 9 contains a stored first table that assigns values of the lateral accelerations to the values of the longitudinal acceleration. It also contains a stored second table that assigns to each pair of values, consisting of the determined value for the lateral acceleration and the momentary value for the steering angle, a value of the maximum vehicle speed. The maximum vehicle speed as an output signal 9c is fed to a comparator 10 as a threshold value in which it is compared with the output signal 1d of the ASR-unit 1 assigned to the momentary driving speed.

The output signals of the E-Gas electronic system 3 act on the power control element 2, represented by a motor operator affecting a throttle valve, via the signal 3a in the sense of a power increase, and via the signal 3b in the sense of a power reduction. The output signal 1c of the ASR unit 1 and the output signal 10a of the comparator 10 also act on the power control element 2 in the sense of a power reduction.

To avoid commands in opposite directions, the mentioned signals are coupled with one another via a logic. The output signal 3a is connected to the non-inverting input of an AND-NOT gate 11, to the inverting input of which the two signals 1c and 10a are fed via an OR-gate 12. A signal at the output of the AND-NOT gate 11 that is initiated by the signal 3a, acts on the power control element 2 in the sense of a power increase as long as no signal 1c or 10a appears.

The output signals 1c, 3b and 10a are connected to the inputs of an OR-gate 13, the output signal of which affects the power control element 2 in the sense of a power reduction.

It is therefore ensured that a power reduction via the signals 1c and 10a always has priority over a power increase by the signal 3a generated by the pressing-to-the-floor of the gas pedal 4.

Therefore, as soon as an ASR-signal 1e appears, a longitudinal acceleration signal is supplied to the characteristic driving diagram device 9 which generates a vehicle speed limit signal. If this signal is exceeded by the vehicle speed signal, the comparator 10 emits an output signal 10a by means of which a power-increasing signal is blocked and the power control element 2 is adjusted in the sense of a power reduction.

In this way, an unstable driving condition of the vehicle because of a slip tendency is prevented.

The input signal 9a to the characteristic driving diagram device 9 from the longitudinal acceleration sensor 5 is also fed to a display unit 14. This display unit 14, derives a value representing an adhesion coefficient and, connected with an acoustic or visual signal, displays it for a certain time period. This display indicates to the driver a value that represents the "skid-resistant properties" of the tires on the momentary road, to which the driver can adapt his method of driving.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. In a propulsion control system for motor vehicles for preventing unstable driving conditions, having a recognition eans for recognizing the tendency to spin of the driven wheels of at least one axle, having a control system means for affecting a power control element of the vehicle engine in parallel to a gas pedal, having a vehicle speed sensor means, having a longitudinal acceleration sensor means, and having a steering angle sensor means, the improvement comprising:

an electronic means for receiving the output signal of the steering angle sensor, for receiving the output signal of the longitudinal acceleration sensor starting at the point in time at which the spinning tendency of at least one wheel is determined by said recognition means for a certain duration, and for generating threshold valve of vehicle speed;

first means in said electronic means for determining a value of the lateral acceleration from the value of the longitudinal acceleration that is determined when the spinning tendency of a wheel occurs;

second means in said electronic means for determining threshold value of the vehicle speed from said determined lateral acceleration value and the steering angle and for providing it as a output signal; and a comparator means for comparing the output signals of the vehicle speed sensor means and of the electronic means and for emitting an output signal when the vehicle speed exceeds the threshold value; and said control system means affects a power reduction of the power control element of the vehicle engine in response to the output of said comparator means.

2. A system according to claim 1, including a display means, for receiving the longitudinal acceleration input signal of the electronic unit and for determining and displaying a value symbolizing a certain adhesion coefficient as a function of said longitudinal acceleration input.

3. A system according to claim 2, wherein said display means is selected from the group of acoustic and visual displays.

4. A system according to claim 1, wherein said first and second means each include a look up table.

5. A system according to claim 1, wherein said control system means affects power reduction in response to said output of said comparator means irrespective of the position of said gas pedal.

* * * * *